United States Patent [19]

Krügener et al.

[11] Patent Number: 4,773,703
[45] Date of Patent: Sep. 27, 1988

[54] VEHICLE SEAT

[75] Inventors: Rolf Krügener, Sindelfingen; Eberhard Faust, Stuttgart; Josef Klink, Nagold; Ulrich Maier, Sindelfingen, all of Fed. Rep. of Germany

[73] Assignee: Daimler-Benz Aktiengesellschaft, Stuttgart, Fed. Rep. of Germany

[21] Appl. No.: 98,869

[22] Filed: Sep. 21, 1987

[30] Foreign Application Priority Data

Sep. 19, 1986 [DE] Fed. Rep. of Germany ....... 3631872

[51] Int. Cl.⁴ .............................................. A47C 3/00
[52] U.S. Cl. ..................................... 297/284; 297/337
[58] Field of Search ............... 297/337, 284, 430, 431, 297/458, 459

[56] References Cited

U.S. PATENT DOCUMENTS

| 426,602 | 4/1890 | Muhl | 297/430 |
| 953,872 | 4/1910 | Urba | 297/430 X |
| 3,554,599 | 1/1971 | Pietschmann | 297/284 |
| 4,017,118 | 4/1977 | Cawley | 297/284 |
| 4,401,343 | 8/1983 | Schmidt | 297/337 |

FOREIGN PATENT DOCUMENTS 327448 4/1930 United Kingdom ............... 297/337

Primary Examiner—Francis K. Zugel
Attorney, Agent, or Firm—Barnes & Thornburg

[57] ABSTRACT

In a vehicle seat having a seat cushion subdivided, for set depth adjustment, into individual upholstery elements in the transverse direction of the seat, the individual upholstery elements are connected together by a coupling mechanism. The coupling mechanism is designed so that each of the gaps appearing between the upholstery elements when the depth is adjusted has the same gap width, and the upholstery elements, after conclusion of the set depth adjustment, are fixed in their particular adjusted position.

12 Claims, 3 Drawing Sheets

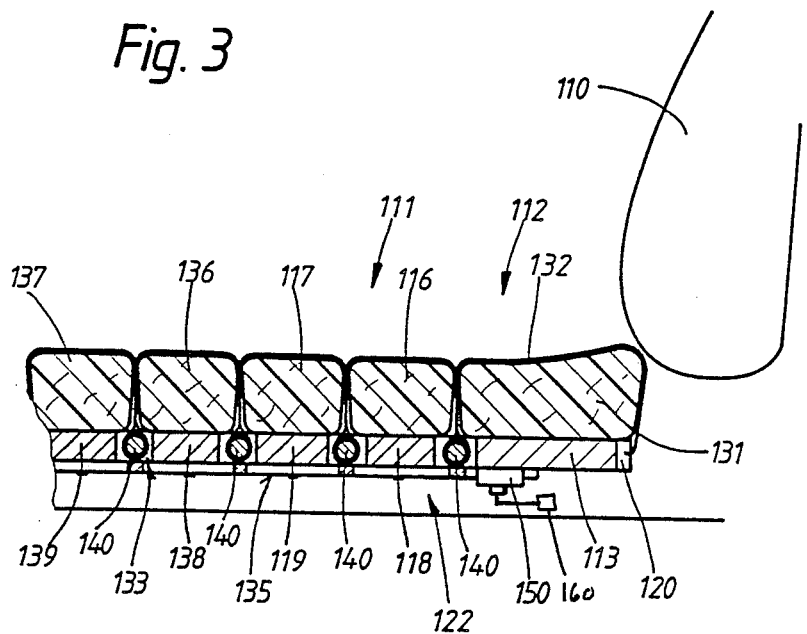
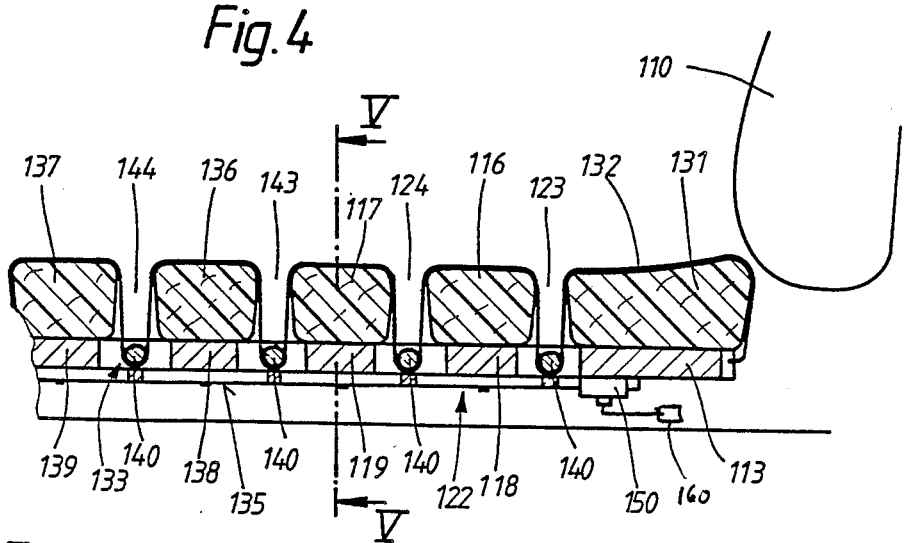
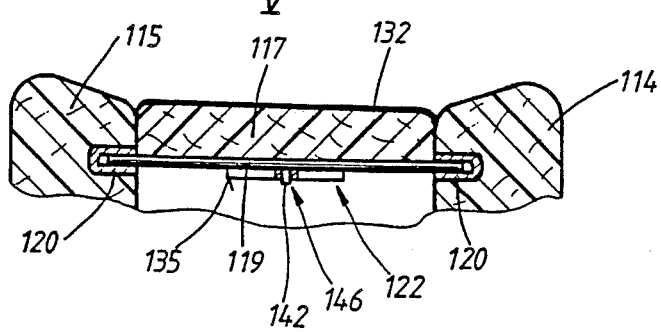

VEHICLE SEAT

BACKGROUND AND SUMMARY OF THE INVENTION

The present invention relates to a vehicle seat adjustable into a plurality of seat adjustment positions and having a back support and a seat cushion which is subdivided into a plurality of individual upholstery elements separated in a transverse direction of the seat. The upholstery elements are connected together and displaceably arranged relative to one another for seat depth adjustment in guides extending in a longitudinal direction of the seat.

In a vehicle seat shown in German Published Unexamined Patent Application No. 3,226,101, the seat cushion has a fixed rear seat cushion part facing towards the seat back and a front seat cushion part which can be displaced in the longitudinal direction of the seat relative to the rear seat cushion part. In order to improve seating comfort by providing leg support, the displaceability of the front part of the seat cushion is used to match the seat depth of the vehicle seat (extending in the longitudinal direction of the vehicle) to the varying thigh lengths of the passengers, which generally fluctuate between 450 mm and 550 mm and can be as much as 600 mm. At maximum seat depth adjustment, however, there is a relatively large gap, of more than 150 mm at times, between the front and rear parts of the seat cushion. The upholstery regions boundering such a wide gap are felt as uncomfortable edges, even with a relatively soft design of the seat cushion upholstery.

In another vehicle seat described in German Published Unexamined Patent Application No. 3,018,323, the seat cushion is subdivided into a multiplicity of individual upholstery elements. The individual upholstery elements are connected together to form an upholstery chain which is connected, at one end, to the seat back and, at the other end, via a tension spring to the passenger compartment structure. In order to adjust the seat depth, the seat cushion has to be displaced relative to the fixed seat back in the longitudinal direction of the seat. This causes gaps or recesses of varying width to form between the individual upholstery elements. Due to the spring tensioning of the upholstery chain, the individual upholstery elements can also be displaced relative to one another due to body movements, (associated with powerful vehicle acceleration or vehicle deceleration, for example) so that, on the one hand, the person seated has a feeling that the seat is floating and, on the other hand, the width of the seat gap can continuously change and therefore become noticeable. Both effects are uncomfortable to the person seated and have a substantially adverse effect on the seating comfort.

An objective of the present invention is to improve the seating comfort of a vehicle seat which is adjustable into a plurality of seat adjustment positions having a seat cushion which is subdivided into a plurality of individual upholstery elements separated in a transverse direction of the seat, these upholstery elements being connected together and displaceably arranged relative to one another for seat depth adjustment.

This and other objectives are achieved in the present invention by providing a vehicle seat having a seat cushion which is subdivided into a plurality of individual upholstery elements which are displaceably arranged relative to one another in a longitudinal direction, with coupling means for coupling the upholstery elements such that a gap appears during seat depth adjustment between each said upholstery element, wherein each gap has an approximately equal width for each seat adjustment position. The coupling mechanism also fixes the upholstery elements in their particular adjusted positions.

In the vehicle seat according to the present invention, the total seat depth change of the seat cushion is positively subdivided between a plurality of gaps which all have the same gap width. This is dimensioned in such a way that the dimension of a normal pleat is not exceeded even in the case of maximum seat depth. Such relatively narrow gaps, however, cannot be felt when sitting. At the same time, the upholstery elements are fixed in every adjustment position, relative to one another and relative to the seat sub-frame, by a coupling mechanism for adjusting identical gaps. In other words, the upholstery elements are fixed so that they are invariable and cannot be moved in any event by the body weight of the person seated. The occupant of the vehicle therefore has a secure seat and feels better when seated.

An advantageous embodiment of the coupling mechanism, according to the present invention, for restraining the upholstery elements and adjusting constant gap widths provides a plurality of air chambers associated with the upholstery elements, these air chambers being connectable to a compressed air system for inflation and deflation. This embodiment is used preferentially in vehicles with compressed air equipment. When the seat depth is reduced, the upholstery sections are then returned either in accordance with an exemplary embodiment which uses spring elastic return elements when the air chambers are deflated, or by connection to an air suction pump which generates a vacuum in the air chambers.

Another advantageous embodiment for restraining the upholstery elements and adjusting constant gap widths provides coupling means which has a trellis gear with trellis arms connected together via pin-joints, these pin-joints including central pin-joints fixed to either the individual upholstery elements or their support elements.

In certain preferred embodiments, the seat cushion has seat upholstery and an upholstery cover covering the seat upholstery, this upholstery cover extending in one piece over the upholstery elements and having dimensions such that the cover stretches over the seat cushion at maximum gap widths between the upholstery elements. Spring tensioning means are provided which have drawn-in force directed towards an underside of the seat cushion and engage with the upholstery cover in the region of the gaps. An alternative embodiment provides an upholstery cover made of elastic covering material which extends in one piece over the upholstery elements and, in a region of the gaps, is fed around tension rods extending in the gaps between the upholstery elements. These tension rods are held on or near a underside of the upholstery element remote from a seating surface in the guides of the upholstery elements. By means of these alternative measures, folds of the upholstery cover will not appear for any seat depth adjustment of the seat cushion. The upholstery cover is thus, always firmly stretched and gives a seat a visually attractive, smooth surface.

Other objects, advantages and novel features of the present invention will become apparent from the following detailed description of the invention when considered in conjunction with the accompanying drawings.

BRIEF DESCRIPTION OF THE DRAWINGS

FIG. 3 shows a diagrammatic representation of a longitudinal section of vehicle seat in accordance with another preferred embodiment of the present invention with the seat cushion adjusted to the smallest seat depth;

FIG. 4 shows a similar representation of the seat cushion in FIG. 3, which is adjusted, for illustration purposes only, to an exaggeratedly large seat depth;

FIG. 5 a diagrammatic representation of a cross-section of the seat cushion along the line V—V in FIGS. 4 and 5.

DETAILED DESCRIPTION OF THE DRAWINGS

Figure 1:
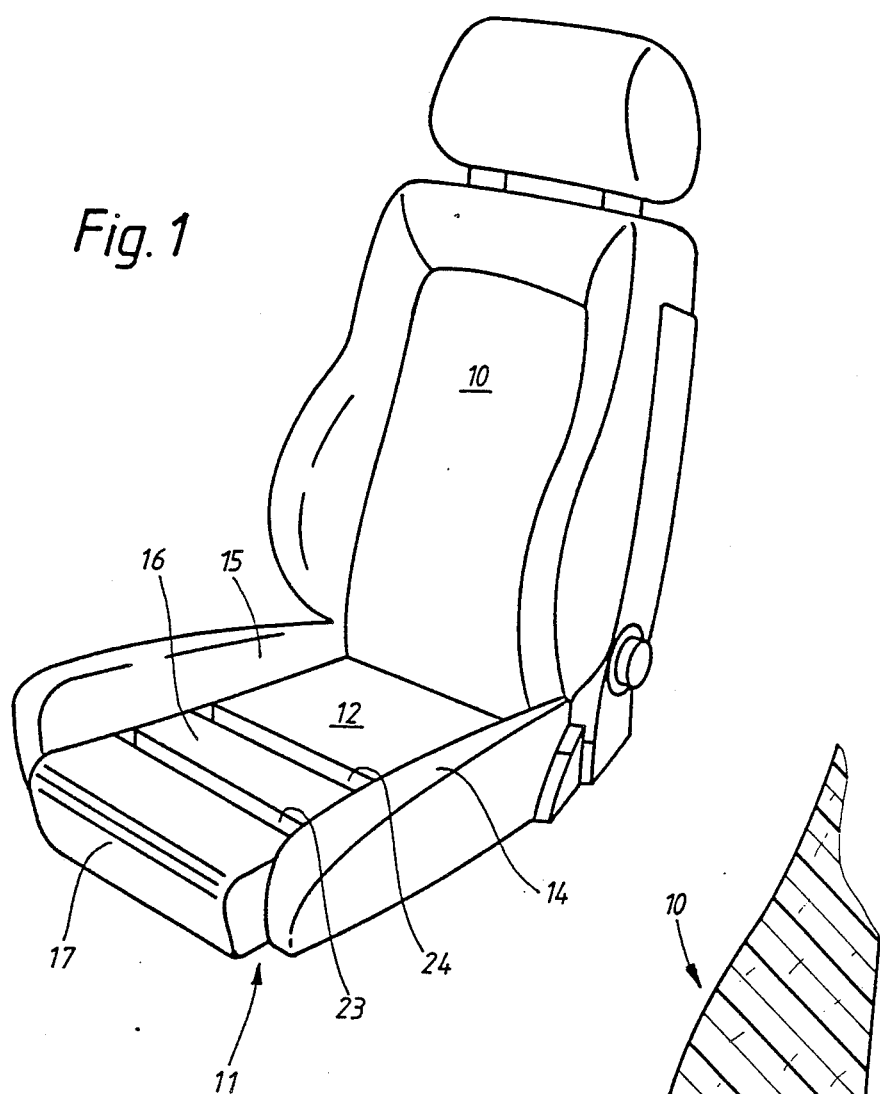
FIG. 1 shows a perspective representation of a vehicle seat with a seat cushion providing seat depth adjustment in a preferred embodiment of the present invention.

FIG. 1 shows a vehicle seat with a seat back 10 and a seat cushion 11 which, for seat depth adjustment, is subdivided into three individual upholstery elements 12, 16 and 17. Two side upholstery parts 14, 15 which limit the seat surface in the longitudinal direction, are used to support the body, particularly when traveling in a curve, and are made in one piece.

Figure 2:
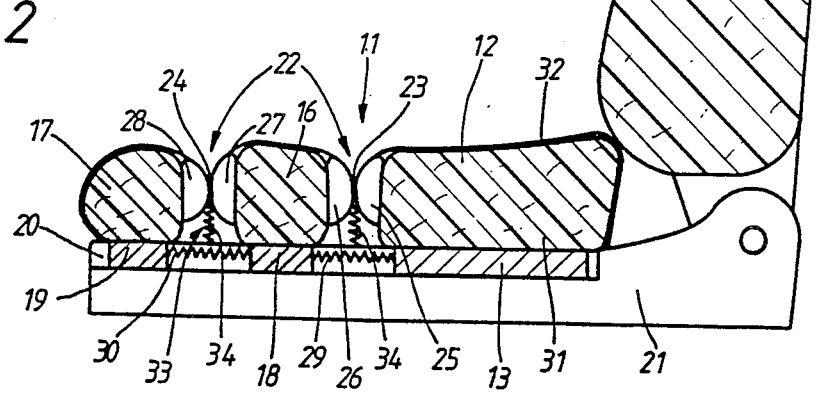
FIG. 2 shows a diagrammatic representation of a longitudinal through a portion of the vehicle seat of FIG. 1.
Figure 6:
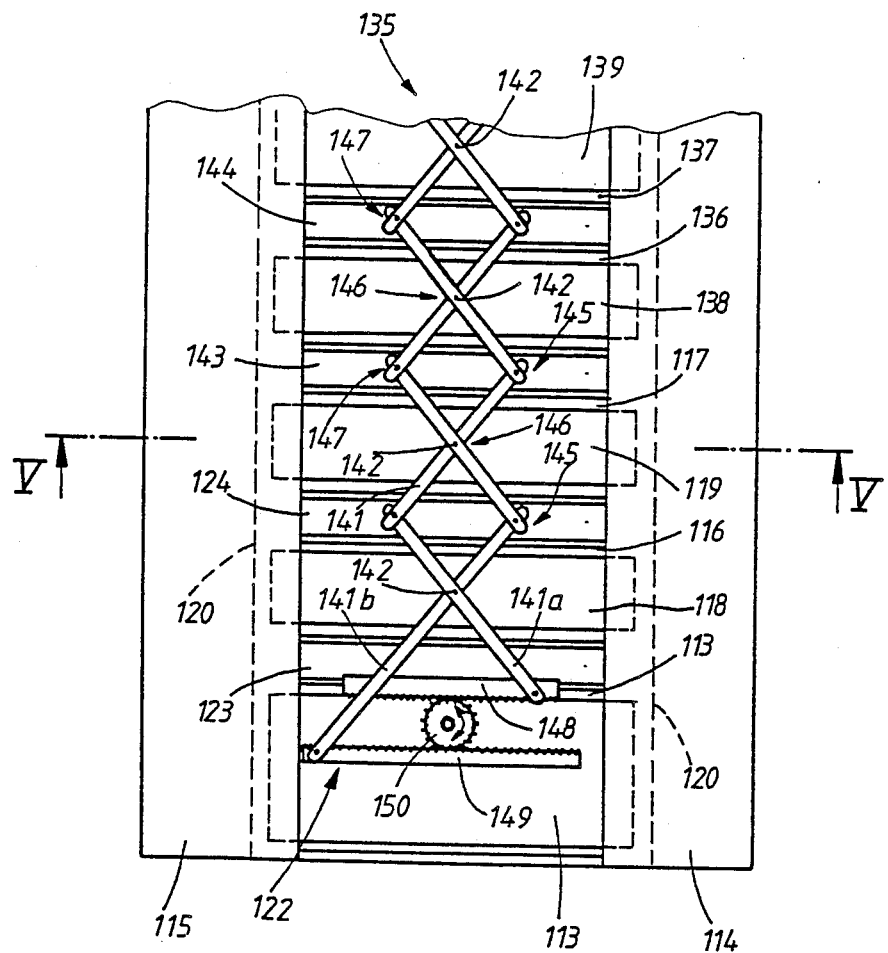
FIG. 6 shows a diagrammatic representation of a bottom view of the seat cushion of FIG. 4.

As may be seen from FIG. 2, the upholstery elements 12, 16 and 17 are fixed, separately from one another, on stiff support elements 13, 18 and 19 whose ends are located in side guide rails of which, in FIG. 2, only the right-hand (viewed in the forward direction of the vehicle) guide rail 20 is shown. The guide rails 20 are held on the seat cushion's sub-frame 21, which is directly connected to the floor of the vehicle. Alternatively, the sub-frame 21, for height and longitudinal adjustment is connected to a frame part, not shown here, which is itself connected to the vehicle floor.

The support element 13 is clamped in the guide rails 20, so that the upholstery element 12 nearest to the seat back 10 is fixed relative to the seat back 10 and the sub-frame 21. The support elements 18, 19 are located in the guide rails 20 so that they can be displaced in the longitudinal direction of the guide rails 20. Since the upholstery element 12 of the seat cushion 11 is fixed so that it cannot be displaced in the sub-frame 21, in a contemplated embodiment this element 12 is directly connected to the sub-frame 21, thus obviating the support element 13.

A coupling mechanism 22 engages at the upholstery elements 12, 16 and 17 with support elements 13, 18 and 19. This coupling mechanism 22 is designed so that in a seat depth adjustment, the gaps 23 and 24 between the upholstery elements 12, 16 on the one hand, and 16, 17 on the other hand, have approximately equal gap widths in every seat depth adjustment position. In addition, the coupling mechanism 22 is designed so that the upholstery elements 12, 16 and 17 remain fixed relative to the sub-frame 21 in each of their adjusted positions and cannot be displaced by the body weight of a person sitting on the vehicle seat.

In the coupling mechanism 22 (shown diagrammatically in FIG. 2), which is effective in the regions of the gaps 23, 24 and acts there on the individual upholstery elements 12, 16, 17, flexible air chambers 25, 26 and 27, 28 are respectively arranged in the gaps 23, 24. The air chambers 25–28, which are air bellows in a preferred embodiment, are each fastened in the gap region of mutually facing vertical surfaces of the upholstery elements 12, 16, 17.

The individual air chamber 25–28 are connected to a compressed air system, not shown here, and are inflated and deflated by hand operation of the compressed air system. When the individual air chambers 25–28 are inflated, their volumes increase as do their extensions in the longitudinal direction of the seat. By this means, the upholstery element 16 is displaced relative to the fixed upholstery element 12 and the upholstery element 17 is displaced relative to the upholstery element 16 by the same distance so that between the upholstery elements 12 and 16, on the one hand, and the upholstery elements 16 and 17, on the other hand, gaps 23 and 24 of the same size form in the seat surface. In this process, the seat depth measured in the longitudinal direction of the seat is increased by twice the gap width.

In order to reduce the seat depth, the air chambers 25–28 are deflated by manually pressing a button. When the air chambers 25–28 are deflated, spring elastic return elements 29, 30 acting on the support elements 13, 18 and 19 are effective in the displacement direction of the support elements 13, 18 and 19 to draw the upholstery elements 16, 17 to the fixed upholstery element 12 facing the seat back 10 so that the two gaps 23, 24 almost disappear. The seat cushion 11 is thereby adjusted to the smallest seat depth. Depending on the inflation or deflation of the air chambers 25–28, any given seat depth between the maximum and minimum seat depth ca be adjusted. When the manual button for operating the seat depth adjustment is released, the upholstery sections 16, 17 remain in their adjusted position and are irreversibly restrained in this position by the inflation of the air chambers 25–28 until the air chambers 25–28 are deflated.

In a preferred embodiment, the spring elastic return elements 29, 30 are simple tension springs, one tension spring being fastened between the support elements 13 and 18 and the other tension spring being fastened between the support elements 18 and 19.

As in known seat cushions, the seat cushion 11 described here also has seat upholstery 31 and an upholstery cover 32 covering the seat upholstery 31. Due to the subdivision of the seat cushion 11 into the individual upholstery elements 12, 16 and 17, the seat upholstery 31 is subdivided into just the same sections. The upholstery cover 32, on the other hand, extends in one Piece over all the upholstery elements 12, 16, 17 and its size is dimensioned so that it stretches over the complete seat cushion 11 at the maximum adjustment of the seat depth, in other words, at the maximum gap width of the gaps 23, 24. At this seat depth adjustment, the upholstery cover 32 is stretched almost tight over the surface of the seat cushion 11.

In order to avoid folds when the seat depth is reduced, spring tensioning elements 33 are fastened to the upholstery cover 32 in the region of the gaps 23, 24. These tensioning elements 33 draw the upholstery cover 32 downwards into the gap region with a drawing-in force directed towards the underside of the seat cushion 11. In the illustrated embodiment shown in FIG. 2, the tensioning elements 33 are elastic strips 34 extending along the gaps 23, 24. These strips 34 are, on the one hand, sewn to the upholstery cover 32 and, on the other hand, are fastened under the upholstery elements 12, 16, 17 to the guide rails 20, for example. By means of these tensioning elements 33, the upholstery cover 32 extending over the individual upholstery elements of the seat upholstery 31 is always smoothly stretched so that there is always an attractive smooth seat surface in every position of the upholstery elements 16, 17.

Another preferred embodiment of a vehicle seat according to the present invention, shown diagrammatically in FIGS. 3-6, has many of the same parts as the vehicle seat according to FIG. 1 so that the same components are provided with the same reference numerals, increased however by 100.

In contrast to the seat cushion 11 in FIGS. 1 and 2, the number of upholstery elements 116, 117, 136 and 137 which can be displaced in the guide rails 20 is increased. Just as the upholstery elements 112, 116 and 117 are fastened to the support elements 113, 118 and 119, the further upholstery elements 136 and 137 are restrained on support elements 138 and 139 whose ends are also located displaceably in the guide rails 120.

As in the exemplary embodiment of FIGS. 1 and 2, the individual upholstery elements 112, 116, 117, 136, 137 are again, in this case, positively coupled together by a coupling mechanism 122. The coupling mechanism 122, which can be seen most clearly in FIG. 6, has a trellis gear 135, which is driven by motive force means 160 supplied by an electric motor or manually by means of a hand wheel.

The trellis arms 141 of this trellis gear are connected together by three pin-joint positions 145, 146 and 147 in each arm. The central pin-joint positions 146 of the trellis arms 141 are fixed, one each, to the support elements 118, 119, 138, 139 which are located displaceably in the guide rails 120. For this purpose, fixed pins 142 are, in the simplest case, held in the support elements, these pins being fed through holes in the center of two trellis arms 141 pin-joint connected with one another.

The two last trellis arms 141a and 141b facing towards the fixed upholstery element 112 are pin-joint connected, one with each of two racks 148 and 149 which can be displaced in mutually opposite directions. A pinion 150 engages with the two racks 148, 149, this pinion being driven by a reversible electric motor means 160. If the pinion 150 in FIG. 6 rotates in the clockwise direction, the rack 148 is moved towards the right and the rack 149 is moved towards the left so that the trellis gear 135 is drawn together. By means of the pin-joint positions 146 fixed to the displaceable support elements 118, 119, 138, 139, the movable upholstery elements 116, 117, 136, 137 are adjusted in the direction of seat depth reduction, and the gaps 123, 1124, 143, 144 present between the upholstery elements 112, 116, 117, 136, having their gap width reduced. If the pinion 150 is rotated in the counterclockwise direction, the rack 148 in FIG. 6 moves to the left and the rack 149 moves to the right. The trellis gear 135 is thereby expanded and the movable upholstery elements 116, 117, 136, 137 are moved away from one another to increase the seat depth. If the electric motor is switched off, the trellis gear 135 is jammed and movable upholstery elements 116, 117, 136, 137 are held irreversibly in their instantaneous position.

In this second illustrated embodiment shown in FIGS. 3-6, the seat cushion 111 again has seat upholstery 131 and an upholstery cover 132. While the seat upholstery 131 is subdivided in equal parts and equal sections corresponding to the subdivision of the seat cushion 111 into the upholstery sections, 112, 116, 117, 136, 137, the upholstery cover 132, which is here manufactured of an elastic covering material, is stretched in one piece over the upholstery elements 112, 116, 117, 136, 137. The upholstery cover 132 is fed around tension rods 140 which are located in the gap region between the upholstery elements 112, 116, 117, 136, 137 near the underside of these upholstery elements. The tension rods 140 extend over the whole of the longitudinal extension of the gaps 123, 124, 143, 144 and it is desirable that their ends should be located in the guide rails 120 so that they are displaced along with the movable upholstery elements 116, 117, 136, 137. Because of the elasticity of the covering material of the upholstery cover 132, there is again, in this case, an uncreased, smooth seat surface in every seat depth adjustment position.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Vehicle seat adjustable into a plurality of seat adjustment positions and having a back support and a seat cushion which is subdivided into a plurality of individual upholstery elements separated in a transverse direction of the seat; said upholstery elements each resting on rigid support means and being connected together and displaceably arranged relative to one another for seat depth adjustment by having ends of the rigid support means displaced in fixed guides extending in a longitudinal direction on both sides of the seat; coupling means for connecting said upholstery elements together such that a gap appears during seat depth adjustment between each said upholstery elements; wherein each said gap has an approximately eqaul width relative to the other said gaps for each said seat adjustment position and said upholstery elements are each fixed in a particularly adjusted position and wherein said coupling means causes displacement of the ends of said support means uniformly in said guide to separate said upholstery elements from one another.

2. Seat according to claim 1, wherein said coupling means has a plurality of flexible air chambers at least one of which is associated with each of said upholstery elements, said air chambers being connectable to a compressed air system for inflation and deflation.

3. Seat according to claim 2, further comprising spring elastic return means connected to each upholstery element and biased to return each upholstery element from a separated condition to a position connecting said upholstery elements with each other.

4. Seat according to claim 2 wherein each of said air chambers is fastened in one of said gaps between mutually facing vertical surfaces of said upholstery elements.

5. Seat according to claim 2 wherein each of said air chambers is fastened in one of said gaps between mutually facing vertical surfaces of said upholstery elements.

6. Seat according to claim 1, further comprising spring elastic return means connected to each upholstery element and biased to return each upholstery element from a separated condition to a position connecting said upholstery elements with each other.

7. Seat according to claim 1, wherein said coupling means has a trellis gear means which drives two opposed longitudinal racks, trellis arms connected together via pin-joints, said pin-joints including central pin-joints fixed to at leas one individual said rigid support elements and wherein each rack is connected to a different trellis arm.

8. Seat according to claim 7 wherein said trellis arms have holess in their centers for receiving said central pin-joints, said pin-joints being formed by pins held on said support elements.

9. Vehicle seat adjustable into a plurality of seat adjustment positions and having a back support and a seat cushion which is subdivided into a plurality of individual upholstery elements separated in a transverse direction of the seat; said upholstery elements being connected together and displaceably arranged relative to one another for seat depth adjustment in guides extending in a longitudinal direction of the seat; coupling means for coupling said upholstery elements such that a gap appears during seat depth adjustment between each said upholstery elements; each said gap having an approximately equal width relative to the other of said gaps for each said seat adjustment position; said upholstery elements each being fixed in a particularly adjusted position; stiff support elements with ends diplaceably located in guides; said coupling means having a trellis gear with trellis arms connected together via pin-joints; said pin-joints including central pin-joints fixed to at least one individual of said upholstery elements; said trellis arms having holes in their centers for receiving said central pin-joints; said pin-joints being formed by pins held on said support elements; two racks longitudinally displaceable in mutually opposite directions and motive means engaging with and displacing said racks, and wherein each of two of said trellis arms pin-joints connected to one another at their centers are, at their ends, pin-joint connected respectively to one of said racks.

10. Seat according to claim 9, wherein said seat cushion has seat upholstery and an upholstery cover covering said seat upholstery, said upholstery cover extending in one piece over said upholstery elements, and having dimensions such that said cover stretches over said seat cushion at maximum gap widths between said upholstery elements; and further comprising spring tensioning means with drawing-in force directed towards an underside of said set cushion that engages with said upholstery cover in a region of said gaps.

11. Seat according to claim 10, wherein said tensioning means are elastic strips extending along said gaps, said elastic strips being sewn to said upholstery cover and fastened beneath said upholstery elements.

12. Seat according to claim 9, wherein said seat cushion has seat upholstery and an upholstery cover covering said seat upholstery, sadi upholstery cover being elastic covering material which extends in one piece over said upholstery elements and, in a region of said gaps, is fed around tension rods extending in said gaps between said upholstery elements, said tension rods being held on or near an underside of said upholstery element remote from a seating surface, in said guides of said upholstery elements.

* * * * *